Feb. 7, 1967   B. F. HAAG   3,302,660
TAPPING VALVE FOR BEER KEG
Original Filed Aug. 19, 1964   2 Sheets-Sheet 1
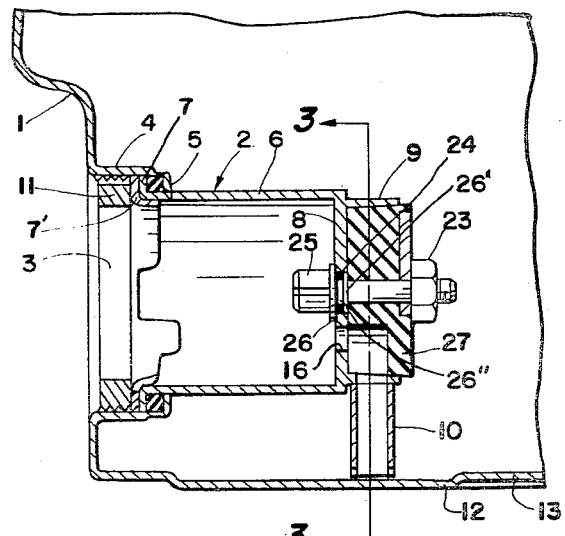
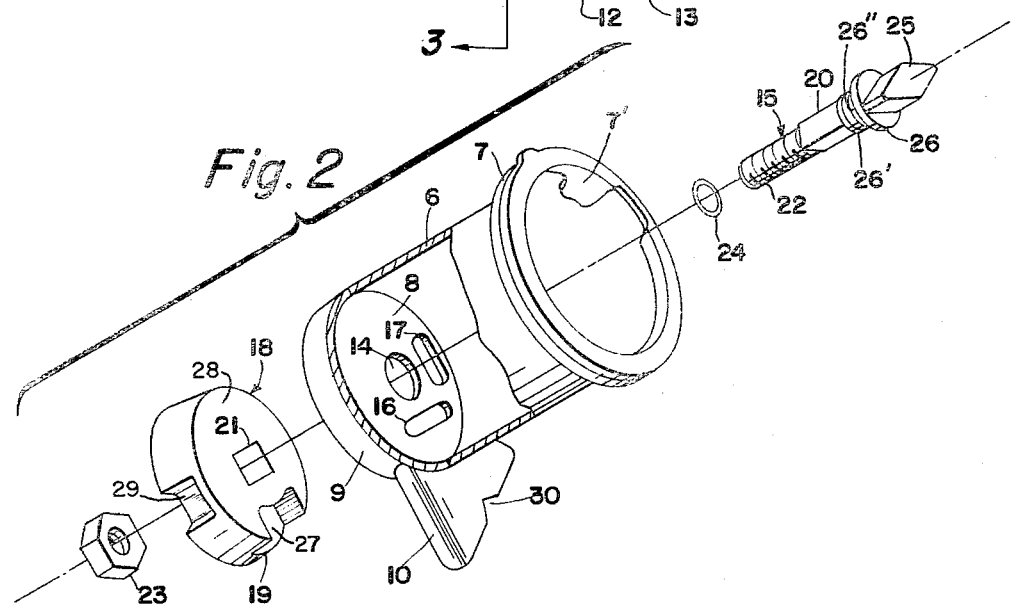
INVENTOR.
BARON F. HAAG
BY Walter J. Moracelli
ATTORNEY Feb. 7, 1967　　　B. F. HAAG　　　3,302,660
TAPPING VALVE FOR BEER KEG
Original Filed Aug. 19, 1964　　　2 Sheets-Sheet 2

INVENTOR.
BARON F. HAAG
BY
ATTORNEY

United States Patent Office 3,302,660
Patented Feb. 7, 1967

3,302,660
TAPPING VALVE FOR BEER KEG
Baron F. Haag, Wickliffe, Ohio
(10261 Mayfield Road, Chesterland, Ohio 44026)
Continuation of application Ser. No. 390,682, Aug. 19, 1964. This application Apr. 22, 1966, Ser. No. 544,453
6 Claims. (Cl. 137—240)

This application is a continuation of application Serial No. 390,682, filed August 19, 1964, now abandoned.

This invention relates to an improved valve. More specifically, it relates to an improved valve for tapping beer kegs. Still more specifically, this application relates to the special design of seal or gasket effective in valves of this type.

For some time beer has been dispensed from beer kegs standing in an upright position by the application of pressurized gas at the top of the keg and having the beer dispensed through a valve fitted into the side wall at a point near the bottom of the keg. In standard designs of valves for this purpose, a tapping device is adapted to be fitted into the valve and when the tapping device is rotated to open the valve, it is thereby locked into the valve. The valve is closed by reversing the rotation of the tapping device in such a manner that reversal of its original position serves to free the tapping device for removal from the valve.

Since the design of the keg and the valves make it necessary that the outlet port of the valve be located as much as an inch or more from the bottom of the keg, the port must be adapted to reach to the bottom of the keg so as to drain completely the full content of beer in the keg. If the port is not so connected to reach to the very bottom of the keg, the pressurized gas will blow through the valve and leave remaining at the bottom of the keg a considerable amount of beer which is a loss to the purchaser.

Lamoureux Patent 2,545,620 discloses a valve provided with a radially disposed tubular extension, the inlet tubing of which is disposed immediately adjacent to the bottom of the keg at the time the valve is open. This enables substantially complete draining of the keg. However, when the valve is closed this tubular extension is in a position parallel with the bottom of the keg. Therefore, when the keg is washed or cleaned, the tubular extension is not in a position to be drained properly of cleaning solution, etc.

This same design of valve has a number of disadvantages. For example, the design of key 38 and keyway 39 involve an expensive machining operation. Locking of gasket 43 to member 37 requires the use of adhesive which is not positive and is unsanitary. The gasket 47 is at the top of the valve stud and it does not provide any protection if gasket 43 should leak. Moreover, if the bottom of the barrel is bent inwardly, the spout or conduit member 50 will be unable to rotate to the bottom of the barrel or make a complete 90° turn.

Other designs of valves have been suggested in which the tubular extension is in a fixed position and designed to clear itself of cleaning fluids during the cleaning operation. However, these modifications have other disadvantages.

For example, in Sariotti and Tonna Patents 3,115,149 and 3,115,150, the valve portions are so designed that there is leakage from one part of the valve to another and also through the valve. Thus, cylinder 46 must have a very tight fit with valve body 20 which means an expensive manufacturing operation. Furthermore, disc 48 is the sole means for effecting a seal, and if disc 48 leaks the liquid will be leaking to the outside of the barrel. Furthermore, if bayonet 34 is spot-welded in place, it is very difficult to replace disc 48.

In these same patents, the nature and size of cap 24 permit only a small hole 44 to be drilled. Such a small opening for the admission of water for cleaning permits a rate of flow through the valve too slight to give a good cleaning action. The path for this cleanout is small and intricate and the means for cleaning the same or determining when the opening is clogged are inadequate. The several small intricate passages are not openly exposed and are very difficult to reach with standard spraying equipment.

Moreover, since the Sariotti-Tonna seal is on the outside of the barrel, the internal pressure tends to force the seal off its seat. Furthermore, the valve is of such a complicated design that it cannot be manufactured at a price satisfactory to the brewing industry.

In the valve of the present invention, the tubular extension remains fixed in such a position, regardless of whether the valve is opened or closed, that the last small portion of beer can be drained from the keg and still render the valve self-cleaning of cleaning fluids in the cleaning operation. Moreover, the valve of this invention is constructed in such a manner that there is no leakage through the valve parts nor through the valve.

The construction of the improved valve of this invention and other advantages inherent therein are apparent from the drawings and the following descriptions thereof.

FIGURE 1 shows a side elevational view taken in cross-section of the valve positioned in the lower edge of a beer keg, part of the keg also being shown in cross-section in the small region adjacent to the opening in which the valve is positioned.

FIGURE 2 is a view of the valve in perspective with the various parts of the valve in disassembled arrangement.

Figure 3:
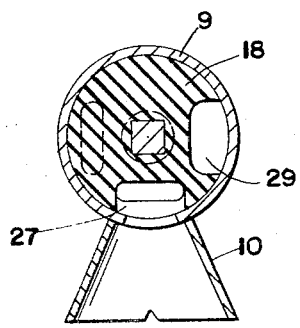
FIGURE 3 is a detailed view in section taken along line 3—3 of FIGURE 1 and taken when the valve is in the open position.

Keg 1 is shown in cross-section in FIGURE 1 and only in the lower portion where the tapping valve 2 is inserted in keg opening 3 and attached. The keg opening 3 is defined by the inwardly directed sleeve 4 which terminates in radially inwardly directed flange 5. The tapping valve has a sleeve portion 6 with a radially outwardly directed flange 7 at one end and at the other end thereof an end wall 8, beyond which the sleeve portion 9 extends and connects with tubular extension 10 which projects in a direction substantially perpendicular to the axis of said sleeve portion and communicating with the interior of said extending sleeve portion 9. The interior of sleeve portion 6 at the end having outwardly directed flange 7 is adapted to have inserted and locked therein a tapping handle (not shown) to conduct away the beer dispensed through the tapping valve when it is in operation. Bayonet 7' is welded onto flange 7 to permit the locking of the tapping handle.

The valve is held in position and sealed liquid-tight by the insertion of threaded ring 11 which is screwed into threads of the inner wall of the keg inwardly directed sleeve 4. When the valve is inserted in opening 3, it is positioned so that tubular extension 10 extends toward the bottom of the keg and the end thereof is closely positioned to the bottom of the wall 12 which is positioned in the bottom 13 of the keg in the region in which the valve is attached.

End wall 8 has opening 14, concentric with the axis of the sleeve portion 6 of the valve, for the purpose of accommodating bolt 15. End wall 8 also has openings 16 and 17 communicating between sleeve portions 6 and 9. Openings 16 and 17 are preferably oblong. Seal 18, which is preferably made of Buna N but can be made of any hard rubber or plastic material resistant to beer and alkali, is adapted to fit snugly into sleeve portion 9 and in its outer configuration is essentially a truncated cone with side wall 19 having a slight taper so that the stopper will fit snugly against end wall 8 but still capable of being rotated upon its own axis.

Bolt 15 has a section 20 with a square cross-section although it can also be rectangular, triangular, or other non-circular cross-section adapted in size and shape to fit into opening 21 of seal 18 so that seal 18 will be rotated when bolt 15 is rotated on its axis. Bolt 15 has a flange portion 26 adapted to rest against end wall 8 when inserted in opening 14 and tightened, with cylindrical portion 26′ fitting snugly against the inner wall of opening 14. O-ring 24 fits into recess 26″ between flange 26 and cylindrical portion 26′ to provide a sealing fit against the side wall of opening 14. Bolt 15 also has a threaded portion 22 adapted to receive nut 23 and, upon appropriate turning of the nut, the nut will press seal 18 against end wall 8 to provide a snug fit and liquid-tight seal. The end of bolt 15 is provided with polygonal end 25, which in this case is substantially parallelogram or diamond shaped in cross-section, adapted to receive a key which can effect rotation of bolt 15 on its axis and thereby likewise rotate seal 18. Seal 18 has a port or cutaway section 27 in the side wall and the end thereof which fits against end wall 8.

Figure 4:
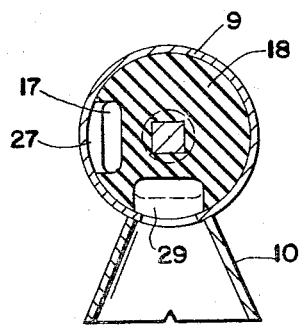
FIGURE 4 is a view similar to that of FIGURE 3 taken when the valve is in a closed position and set for drainage through the spout or tubular extension.

In the view shown in FIGURE 3 taken at the cross-sectional line 3—3 of FIGURE 1, the cutaway section or port 27 is shown in a position providing a communication between opening 16 of end wall 8 and the tubular extension 10. In this position the liquid contents of the keg are free to flow up tubular extension 10 into and through opening 16 and into the interior of the valve from whence it flows out through the pipe or tapping handle dispenser previously mentioned but not shown. When the key is turned so as to rotate the seal 18 approximately 90° on its axis, cut out section or port 27 is turned out of communication with opening 16, and end wall 28 of stopper or seal 18 provides a right seal against opening 16 so as to cut off flow of the liquid content of the keg. In this position as shown in FIGURE 4, port or cutaway section 29 is in communication with tubular extension 10 and also with the inner region of the keg so that if the liquid content of the keg has been drained to that level the atmosphere in the keg is free to enter the top of tubular extension 10 and thereby permit drainage of liquid from the top of tubular extension 10. This arrangement likewise provides complete drainage when the keg is being washed. Tubular extension 10 has a V-notch 30 to provide clear passage into the interior of tubular extension 10 in the event there is any sediment collecting between the lower end of tubular extension 10 and the adjacent inside area of the keg, or in the event the bottom of the barrel in that region is bent inwardly.

Figure 5:
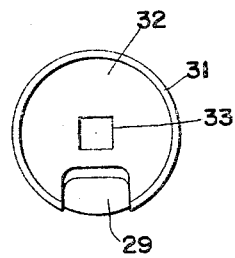
Figure 6:
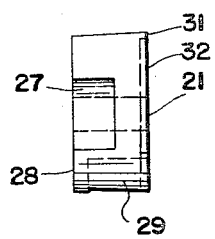
Figure 7:
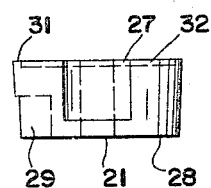

FIGURES 5, 6 and 7 show a construction of seal 18. As previously indicated, the general configuration of seal 18 is that of a truncated cone with flat wall portion 28 being the top of the truncated cone and end 31 being the base in the cone. Base 31 has a recessed portion which is fitted with a thin metal plate 32, preferably of stainless steel, adapted to protect the plastic from excessive contact with the contents of the keg. This plate has an opening 33 generally corresponding in configuration with opening 21 in the seal and is of sufficient size to accommodate the insertion of bolt 15 therethrough. Then nut 23 is tightened on bolt 15 spreading O-ring 24 against the side walls of opening 14 and providing a seal against leaking. Cutaway portion or cleanout port 29 is on this side of the seal 18 and has the corresponding cutaway section in plate 32.

In applicant's valve, seal 18 is toward the inside of the barrel. Therefore the internal pressure in the barrel helps to make the seal more effective. Cleanout port 29 is simple to clean and has approximately 21 times greater valve-cleaning capacity over the Sariotti-Tonna valve. Since cleanout port 29 is freely exposed to the inside of the barrel, it is easily cleaned with spray nozzles used in cleaning the barrel.

One of the chief advantages of applicant's tapping valve is the fact that in the alkali wash and the rinsing steps, the washing and flushing liquid fed into the interior of the keg through the valve can simultaneously provide drainage through the spout or extension 10 which reaches to the bottom of the barrel. During the washing and rinsing steps seal 18 is positioned as shown in FIGURE 4 where port 27 of the seal 18 is opposite port opening 17 thereby providing a passageway so that any liquid trapped in port 27 flows through port opening 17 into the interior of the valve. At the same time port opening 29 is positioned in communicating relationship with the passageway in tubular extension 10 so that the wash liquid or rinse liquid can flush out passageway in extension 10. This also means that the tubular extension 10 is vented at the top so that there is immediate and complete drainage of washing or rinsing liquid from tubular extension 10.

Thus drainout port 27 permits trapped beer to drain out, thereby exposing the valve to less contamination. When in a closed position, port 27 is lined up with port opening 17 permitting liquid in port 27 to flow or drain therefrom thereby enhancing the sanitary features of the valve. Such operations are not permitted or effected by any of the prior art valve designs.

Another of the chief advantages of applicant's valve is that the design lends itself to reasonable manufacturing costs, particularly since it does not require close tolerance ground fittings and other expensive operations.

Moreover, in applicant's valve, seal 18 is on the inside of the barrel and consequently the pressure in the barrel helps effect the sealing. This is much more effective and advantageous than the prior art seal shown on the outside of the barrel. Furthermore, cleanout port 29 has much greater self-cleaning capacity over prior art designs, for example approximately 21 times greater than in the Sariotti-Tonna valve. This port 29 is simple to clean since it is freely exposed to the inside of the barrel and easily reached by the sprays used in cleaning the barrel.

Other advantages permitted by applicant's design include the fact that the square hole 21 in disc 18 can advantageously be a press-fit, thereby making a tight seal to prevent leaks down through the center post. O-ring 24 on the outside of the bolt provides additional protection against leakage through seal 18 or under the seat of seal 18 through the center post hole 21.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. In a keg tapping valve adapted for combination with a keg having an interior and a tapping valve orifice for the dispensing of beer therefrom and being of the type of keg which is charged and from time to time recharged with beer, the interior of said keg being sterilized prior to each recharge, which sterilizing of said keg is normally accomplished by the application of an alkali solution followed by rinse water under pressure, said tapping valve being adapted to enable the pressure-dispensing from said keg of substantially the entire volume of beer charged into said keg and being further adapted to enable the complete rinsing from said keg of said alkali solution by said rinse water to thereby insure that none of said alkali solution will remain in said keg to contaminate the beer subsequently charged into said keg, the valve comprising:

(a) a tubular hollow body member having keg-exterior and keg-interior ends, said member being attached to said tapping valve orifice of said beer keg and extending into the interior of said keg, (b) a chamber extending longitudinally of said body member, and terminating in an end wall at said keg-interior end, said end wall having a port opening therein;

(c) means for admitting fluid into said chamber comprising a radial extension attached to said body member adjacent to said end wall and on the keg-interior side of said end wall, said radial extension having a passageway extending the length thereof;

(d) a sealing means on the keg-interior side of said end wall having a first and a second port, said first port in said sealing means adapted to provide a communicating passageway between said end wall port opening and said passageway in said radial extension;

(e) a spindle means, having an accessible portion disposed within said chamber and extending through said end wall and said valve member, adapted to rotate in one direction and thereby to change the relative positions of said sealing means and said radial extension and to bring said sealing means first port into beer-flow communication with said radial extension passageway and said end wall port opening, and also to rotate in the opposite direction to change the relative positions of said sealing means and said radial extension and thereby to take said sealing means first port out of beer-flow communication with said radial extension passageway and to bring the second port located in said sealing means into communication with said radial extension passageway thereby bringing the adjacent end of said radial extension passageway into direct communication with the interior of said keg;

(f) a draining means adapted to drain liquid from said sealing means first port when said first port is out of communication with said radial extension;

(g) said sealing means second port and said radial extension passageway being out of communication with each other when said sealing means first port and said radial extension passageway are in beer-flow communication;

(h) said sealing means second port and said radial extension passageway means being in communication with each other when said end wall port opening and said radial extension passageway are out of communication with each other;

(i) and when the relative positions of said radial extension passageway and said sealing means have the sealing means second port positioned in communication with said radial extension passageway, a vent is thereby provided at the adjacent end of said radial extension passageway to the interior of said keg, thereby allowing drainage of liquid from said radial extension passageway.

2. In a keg tapping valve adapted for combination with a keg having an interior and a tapping valve orifice for the dispensing of beer therefrom and being of the type of keg which is charged and from time to time recharged with beer, the interior of said keg being sterilized prior to each recharge, which sterilizing of said keg is normally accomplished by the application of an alkali solution followed by rinse water under pressure, said tapping valve being adapted to enable the pressure-dispensing from said keg of substantially the entire volume of beer charged into said keg and being further adapted to enable the complete rinsing from said keg of said alkali solution by said rinse water to thereby insure that none of said alkali solution will remain in said keg to contaminate the beer subsequently charged into said keg, said valve comprising:

(a) a tubular hollow body member having keg-exterior and keg-interior ends, said member being attached to said tapping valve orifice of said beer keg and extending into the interior of said keg;

(b) a chamber extending longitudinally of said body member and terminating in an end wall at said keg-interior end, said end wall having a port opening therein;

(c) means for admitting fluid into said chamber comprising a radial extension fixedly attached to said body member adjacent to said end wall and on the keg-interior side of said end wall, said radial extension having a passageway extending the length thereof;

(d) a sealing means on the keg-interior side of said end wall having a first and a second port, said first port in said sealing means adapted to provide a communicating passageway between said end wall port opening and said passageway in said radial extension;

(e) a spindle means, having an accessible portion disposed within said chamber and extending through said end wall and said valve member for rotating said sealing means in one direction to bring said sealing means first port into beer-flow communication with said radial extension passageway and said end wall port opening, and also for rotating said sealing means in the other direction to take said sealing means first port out of beer-flow communication and to bring the second port location in said sealing means into communication with said radial extension passageway thereby bringing the adjacent end of said radial extension passageway into direct communication with the interior of said keg;

(f) a drainage means adapted to drain liquid from said sealing means first port when said first port is out of communication with said radial extension;

(g) said sealing means second port and said radial extension passageway being out of communication with each other when said sealing means first port and said radial extension passageway are in beer-flow communication;

(h) said sealing means second port and said radial extension passageway means being in communication with each other when said end wall port opening and said radial extension passageway are out of communication with each other;

(i) and when said sealing means second port is positioned in communication with said radial extension passageway a vent is thereby provided at the adjacent end of said radial extension passageway to the interior of said keg, thereby allowing drainage of liquid from said radial extension passageway.

3. The tapping valve of claim 2 in which said chamber end wall has extending from the side thereof facing into the interior of said keg a substantially cylindrical extension of relatively short length having said radial extension passageway affixed thereto and communicating with an opening in said cylindrical extension, said cylindrical extension being adapted to receive said sealing means internally and in a close fit therewith.

4. The tapping valve of claim 3 in which the substantially cylindrical extension has a slight taper in the side walls thereof and said sealing means has an outer shape conforming to a truncated cone with its size and shape conforming to the inner surface of said slightly tapered substantially cylindrical extension and adapted to provide a close fit therein.

5. The tapping valve of claim 4 in which the first port in said sealing means comprises a section cut away from the top and adjacent side wall of said truncated cone, and said second port in said sealing means comprises a section cut away from the base of said truncated cone and the adjacent side of said truncated cone, the two said ports being spaced from each other with respect to the side wall of said truncated cone.

6. The tapping valve of claim 4 in which said sealing means is made of Buna-N synthetic rubber.

References Cited by the Examiner

UNITED STATES PATENTS

| | | | |
|---|---|---|---|
| 1,450,811 | 4/1923 | McGahey | 137—625.24 |
| 2,766,962 | 10/1956 | Fodor et al. | 251—310 |
| 3,115,150 | 12/1963 | Sariotti et al. | 137—240 |

W. F. O'DEA, *Primary Examiner.*

D. R. MATTHEWS, *Assistant Examiner.*